W. Ord,

Piston Packing.

No. 109,242.　　　　　　　Patented Nov. 15, 1870.

Witnesses.　　　　　　　　　　　　　Inventor.
A. Bennethendorf　　　　　　　　　　W. Ord
L. S. Mabee　　　　　　　　　　per Munn & Co
　　　　　　　　　　　　　　　　　Attorneys.

United States Patent Office.

WILLIAM ORD, OF BROOKLYN, OHIO.

Letters Patent No. 109,242, dated November 15, 1870.

---

IMPROVEMENT IN PISTON-PACKINGS.

---

The Schedule referred to in these Letters Patent and making part of the same.

---

*To all whom it may concern:*

Be it known that I, WILLIAM ORD, of Brooklyn, in the county of Cuyahoga and State of Ohio, have invented a new and Improved Piston-Packing; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
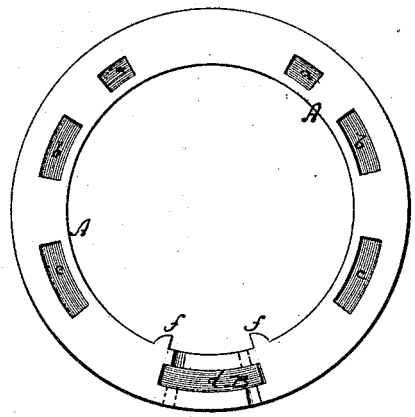
Figure 1 represents a plan view of my improved packing.
Figure 2:
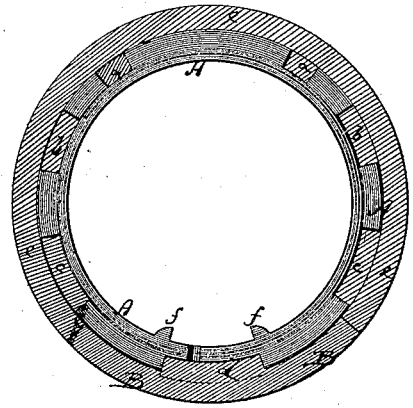
Figure 2 is a transverse section of the same.

This invention relates to new improvements in the construction of the rings for pistons in steam-engines, pumps, &c., and has for its object to provide a convenient packing for the same, and to regulate the elasticity of the ring, making the same equal throughout.

The invention consists in grooving the ring, as hereinafter described, so that it will readily receive a packing of Babbitt or other soft metal, which retains the ring in a compressed state, allowing it to exert its elasticity for a tight fit.

A, in the drawing, represents the piston-ring. It is made of suitable width and thickness, and is cast of suitable material, with transverse slots $a a$, $b b$, $c c$, and $d$, extending through it from face to face.

Figure 3:
Figure 3 is an edge view, partly in section, of the same.

After having been thus cast, the ring is grooved on the edge, the grooves $e e$ reaching the transverse slots, as in fig. 3. The ring, which was cast larger than the bore of the cylinder for which it is intended, is now cut obliquely near the slot $d$, as much being taken out as will allow its compression to the requisite size. Next, the soft-metal packing B is cast into the slots $a b c d$, and allowed to branch thence into the grooves $e$, filling the same entirely, and holding the compressed ring in the contracted state. The ring can now be turned to fit the cylinder, the packing holding it in the contracted state, so that the metal of the ring will retain its proper expansive power.

The soft-metal packing keeps the cut portion of the ring tight.

The packing is cut, whenever desired, by leaving small plates in the grooves while casting the soft metal into the same.

The ring can, if desired, be parted on the inner side of any of the recesses, to remove undue rigidity from its inner part.

$f f$ are ribs, projecting from the inner face of the ring, on both sides of the cut of the same. Between them may be interposed a suitable spring, for spreading the ring whenever the elasticity of the same should have been reduced by wear or otherwise.

Having thus described my invention,

I claim as new and desire to secure by Letters Patent—

A piston ring, provided with the transverse slots $a a$, $b b$, $c c$, and grooves $e$, to receive the soft-metal packing, substantially as herein shown and described.

WILLIAM ORD.

Witnesses:
GEO. W. MABEE,
MILTON J. ROBERTS.